Dec. 6, 1960    A. HARTMANN ET AL    2,962,762
MANUFACTURE OF NON-WOVEN TWO DIMENSIONAL
STRUCTURES FROM FIBERS
Filed Feb. 12, 1958      3 Sheets-Sheet 1

INVENTOR
Adolf Hartmann
Bernhard Fritzsche
BY Connolly and Hutz
ATTORNEY

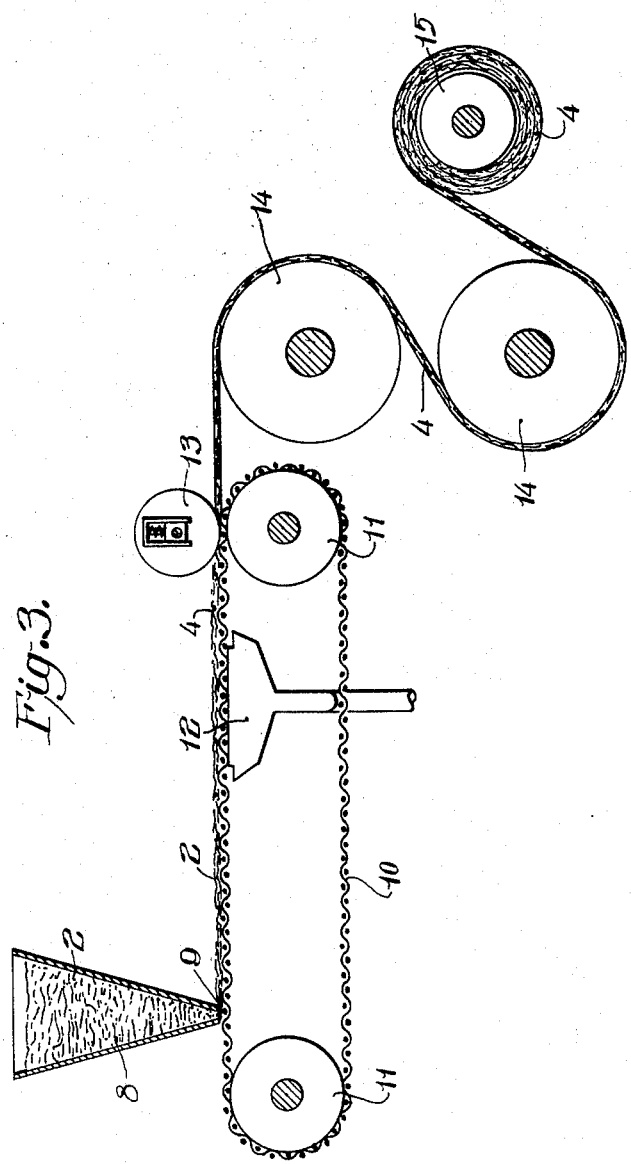

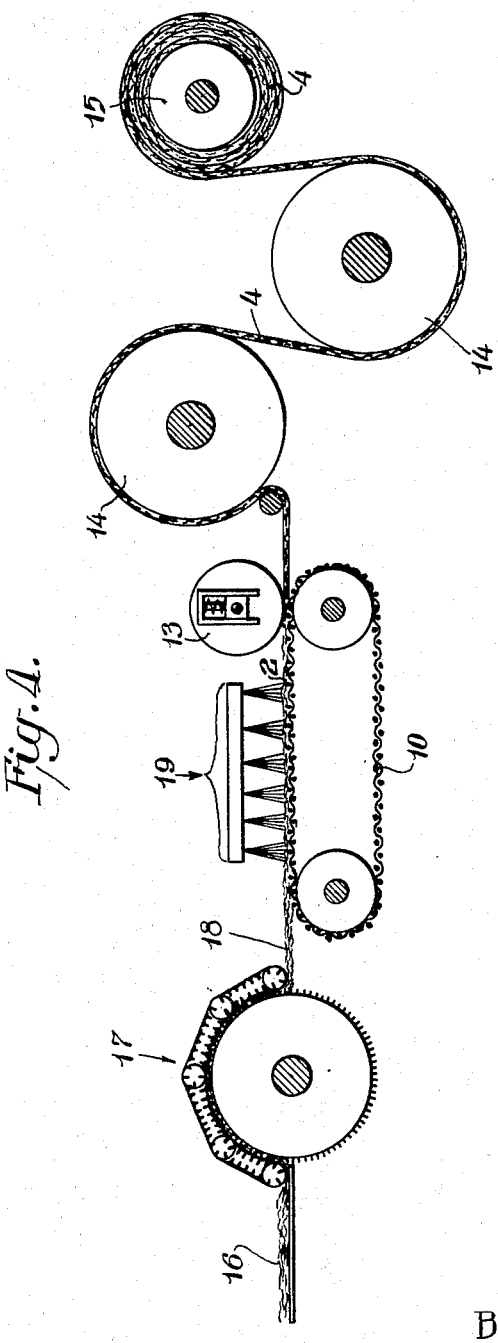

United States Patent Office 2,962,762
Patented Dec. 6, 1960

2,962,762

MANUFACTURE OF NON-WOVEN TWO DIMENSIONAL STRUCTURES FROM FIBERS

Adolf Hartmann, Gessertshausen, near Augsburg, and Bernhard Fritzsche, Bobingen, near Augsburg, Germany, assignors to Farbwerke Hoechst Aktiengesellschaft vormals Meister Lucius & Brüning, Frankfurt, Germany, a company of Germany Filed Feb. 12, 1958, Ser. No. 714,707

Claims priority, application Germany Feb. 13, 1957

10 Claims. (Cl. 18—47.5)

This invention relates to the manufacture of non-woven two dimensional structures from fibers.

The present invention furthermore relates to the manufacture of non-woven two dimensional structures from fibers of polyvinyl alcohol or mixtures of fibers of polyvinyl alcohol with other fibers prepared on the basis of cellulose. It also relates to the manufacture of such structures from fibers of copolymers of polyvinyl alcohol and other monomers.

In particular, the present invention relates to the manufacture of non-woven two dimensional structures of fibers of polyvinyl alcohol of high resistance to heat and water.

Various processes are known for preparing non-woven and not knitted two dimensional structures of fibers. For preparing such structures, it is of particular importance that the individual fibers be sufficiently adherent to one another so that the structures exhibit the necessary strength. For this purpose, a suspension of fibers in water has, for example, been used as starting material. The water contains an admixture of substances of which the predominant part is retained in the structures after the fiber mass has been molded and dried, and which agglutinates the individual fibers. Such substances are, for example, resin soaps, animal glue or synthetic products such as polymers of vinyl chloride or of the derivatives of acrylic acid. Instead of, or in addition to, these substances, compounds which cause the fibers to swell may be used; phenols, for example, may be used in the case of polyamide fibers and thiocyanates or zinc halides may be employed with fibers of polyacrylonitrile. In all of these processes, foreign substances are used in addition to the fibers themselves. This is often disadvantageous. For example, the first mentioned adhesive substances retained in the final products give rise to undesired hardening of the two dimensional structures or render them sensitive to water. The substances used as swelling agents are in most cases only efficient in a high concentration and must be removed from the finished product by troublesome washing procedures. It has also been proposed to prepare nonwoven and non-knitted two dimensional structures in another manner, for example, by preparing a fiber fleece by means of appropriate devices such as a scribbling or carding machine. The fleeces so obtained are strengthened by impregnation or spraying with solutions of substances of an agglutinating effect. When proceeding according to this method, undesirable hardening of the structures cannot be avoided. The aforesaid remedial measures also considerably increase the cost of production. It has furthermore been suggested to prepare nonwoven and non-knitted two dimensional structures from fibers which melt or soften at relatively low temperatures, for example from fibers of polyvinyl chloride, and to heat the resulting structures to the softening temperature of said fibers. The thermostability of the two dimensional structures so obtained is, however, poor, which is often troublesome in the practical application of the articles.

Now, we have found that nonwoven two dimensional structures of high resistance to heat and water can be prepared from fibers without the addition of foreign substances by using a fiber mass consisting partially or completely of fibers of polyvinyl alcohol capable of swelling in water at elevated temperatures without the fiber structure undergoing any change, making said fiber mass into two dimensional structures by shaping, heating the latter in the presence of water to such a temperature that the polyvinyl alcohol fibers swell without being dissolved, and subsequently drying the structures so treated. The term "elevated temperature" is here intended to mean temperatures within the range of 40 and 90° C. The characteristic feature of the process of the invention thus lies in the fact that the adhesion of the fibers to one another is brought about by the use of fibers obtained on the basis of polyvinyl alcohol. It is essential that, at least in part, polyvinyl alcohol fibers are used which swell in the presence of water at elevated temperatures without being dissolved and without their outer structure being changed. It is surprising that with these fibers such a good bonding effect is obtained that two dimensional structures, which after drying, exhibit a high strength and stability can be obtained without the application of any remedial measures such as the use of adhesives even when the aforesaid fibers are mixed with a considerable portion of other fibers which do not swell in water at elevated temperatures and which are firmly bound by the polyvinyl alcohol fibers capable of swelling.

It is of advantage to use polyvinyl alcohol fibers which have been obtained from a polyvinyl alcohol almost free from acetyl groups, for example, a polyvinyl alcohol containing only about 1 to 3% of residual acetyl groups. There can, however, also be used derivatives of polyvinyl alcohol whose hydroxyl groups are occupied to a greater extent by substituents, for example acetal groups, provided that this does not affect the water solubility of the polymers and the stretchability of the fibers obtained therefrom. Besides partially saponified polyvinyl acetates, there come into consideration partial acetals, for example with formaldehyde, pyridine aldehyde or glyoxylic acid. There may also be used fibers of water-soluble saponified copolymers which have chiefly been prepared from vinyl acetate and other hydrophilic monomers such as acrylic acid, acrylic acid amide, methacrylic acid amide or vinylpyrrolidone. It is also possible to use spinning solutions containing, in addition to polyvinyl alcohol, water-soluble linear high molecular compounds in an amount of up to about 20%, calculated upon the polyvinyl alcohol or the aforesaid copolymers, for example polyacrylic acid amide, polyacrylic acid, polyvinylpyrrolidone, partially saponified polyacrylonitrile or water-soluble polycondensates containing amide groups in the main chain.

The polymers or copolymers should have a molecular weight corresponding to a K-value of 70 to 80. The spinning solutions contain about 12 to 18% of polymers or copolymers and 88 to 82% of water. The spinning process may be carried out according to the wet or the dry method. In the dry spinning process the spinning solution is forced through a nozzle into a spinning cell through which hot air is passed. In general, the wet spinning method is used according to which the spinning solution is forced through nozzles into concentrated aqueous salt solutions at elevated temperatures, for example, into a saturated sodium sulfate solution at 65 to 70° C. To improve the whiteness of the fiber, small amounts of polyvalent organic acids such as succinic acid, oxalic acid or citric acid may be added to the spinning solution. The spun fibers are stretched, dried and heated under tension at a temperature above 200° C. The fibers to be used according to the invention should then be capable of swelling in water at elevated temperatures without being dissolved or their outer structure being changed. To meet this demand, the fibers must be especially well oriented since fibers of polyvinyl alcohol which have not been well oriented are relatively readily soluble in water. The fibers must simultaneously possess a high strength when dry. These desired properties are attained, for example, by stretching the filaments, before drying, in a ratio of 1:6 to 1:10 in the cold, drying them under tension and subsequently exposing them under tension for 2 to 10 minutes to a temperature of 210 to 230° C. In many cases, it is, however, of particular advantage to stretch the fibers, prior to the drying process, for example in a ratio of 1:2 to 1:3 at an only moderately low temperature, and to stretch them again, after they have been dried, at a temperature ranging from 215 to 225° C. in a ratio which is advantageously equal to or higher than that applied during the stretching process carried out prior to the drying procedure, so that the total amount of stretching corresponds to a ratio of 1:4 to 1:10, and then to allow the filaments to shrink by a certain percentage, in most cases by 5 to 25%, at a temperature of 220 to 230° C. In this case, the thermal treatment carried out after the drying procedure can be limited to a period of 0.5 to 1.5 minutes. The thermal treatment is advantageously effected in such a manner that the filaments are conducted through heated tubes which are in a horizontal position. Filaments prepared according to the above mentioned methods and consisting to an extent of 100% of polyvinyl alcohol containing 2% or less of acetyl groups are, for example, completely stable in water at 70° C.; they swell at 75 to 90° C. without being dissolved or their outer structure being changed and at this state exert a strong bonding effect. Non-woven and not knitted two dimensional structures prepared from these fibers therefore possess a high strength and stability after being heated in the presence of water and dried.

It is obvious to the expert that the aforesaid pretreatment of the polymer fibers, for example the stretching, thermal treatment and shrinking, and the temperature applied in the after-treatment of the non-woven two dimensional structures must be harmonized. In this respect various possibilities present themselves within the above mentioned ranges. It is essential that the orientation of the fibers permit of adjusting to a swelling temperature at which neither a change of the outer structure of the fiber nor dissolution of the fiber occurs. The temperatures at which the fibers of the non-woven structures are treated with water, i.e. are caused to swell, are within the range of 40 to 95° C.

The non-woven structures are in most cases paper-like products, fiber fleeces or felts. Depending on the intended use of the two dimensional structures, fibers of different length of staple, for example of 0.1 to 10 cm. are used. The fibers may be crimped or not. They are worked up into two dimensional structures according to the dry or wet method. According to the dry method, fleeces or slivers are produced by means of a scribbling or carding machine. According to the wet method, the fiber material is in most cases suspended in water and the shaping is effected by pouring the suspension on to sieves, the excess amount of water being suitably filtered off with suction. While in the wet process, the moisture necessary for the swelling is already present, it is necessary when applying the dry method to add the necessary quantity of water in a suitable manner, for example by spraying, after the shaping process. Both methods can be carried out continuously whereby endless sheetings of two dimensional structures are obtained. The subsequent thermal treatment can be conducted in various ways. For example, the articles may be heated in a closed room, for instance by means of indirect heating, ultrared radiation or high frequency current. It is, however, simpler to expose the articles to the action of saturated steam or to treat them with water at a temperature at which the polyvinyl alcohol fiber swells. The fibers are then dried in the usual manner, for example by means of heated metal surfaces and/or warm moving air. In this stage of the process, the two dimensional structures may simultaneously be exposed to mechanical pressure. It is also possible to emboss the structures or to unite several endless sheetings by pressing.

The structures so obtained are distinguished by a good adhesion of the fibers and a soft pleasant handle. The tearing strength of the structures can be influenced by the staple length of the fibers and their original strength as well as by the degree of mechanical strengthening. When fibers of greater length of staple are used, structures of increased tearing strength are obtained.

The structures can be used for various applications, for example for the manufacture of filling materials, absorptive linings, blotting paper, protective covers, hygienic articles and shock absorbing felts.

In this state the structures are, however, not resistant to hot water. They can be considerably improved in this respect by an after-treatment with compounds of an acetalizing action as they are known for treating fibers and filaments. The acetalisation may be effected by subjecting the structures to a treatment with formaldehyde or high molecular weight aldehydes such as butyraldehyde, nonylaldehyde or dialdehydes such as glyoxal or terephthalaldehyde. In general, formaldehyde is used in a bath containing a salt, which is preferably inorganic, in the presence of an acid compound at a temperature within the range of 50 to 95° C. This treatment can also be carried out continuously. After the treatment the structures are thoroughly rinsed with water and dried.

It is surprising that after treatment with an aldehyde not only the fibers of the two dimensional structures possess an improved resistance to water at elevated temperatures but also the whole article itself exhibits a considerably improved strength and is completely stable in boiling water for a prolonged time. Obviously, the spots of adhesion of the fibers are especially fixed by the acetalisation. The capacity of the articles to absorb water is reduced by the acetalisation. It is, for example, possible to write on the structures in ink without a previous gluing of the surface of the structures being necessary. It is furthermore of great technical interest that the structures can now be dyed or or printed at the boil like woven or knitted goods without the bonding or the strength of the articles being affected. The structures can be dyed with numerous dyestuffs such as dispersion dyestuffs, leucosulfuric acid esters of vat dyes or naphthol combinations, deep dyeings fast to boiling and possessing an excellent level character being obtained. These properties are not to be found in the corresponding two dimensional structures prepared by means of adhesive substances. The products of the present invention have a wide field of application. They may be used, for example, as special papers resistant to water, wallpaper, covers, cheap table-linen, medical articles capable of being sterilized, fleeces fast to boiling, wipers, inner soles or durable felt articles.

The number of technical possibilities offered by the process of the invention is further increased by the fact that as starting material for the two dimensional structures there may also be used fiber mixtures consisting only in part of fibers which have been obtained from polyvinyl alcohol or copolymers of vinyl alcohol with other polymerizable monomers and are capable of swelling. The structures may contain up to about 90% of other fibers not capable of swelling, provided that both types of fibers thoroughly mixed. As fibers not capable of swelling there come into consideration, for example, acetalized fibers of polyvinyl alcohol, fibers of polymers or copolymers of acrylonitrile, vinyl chloride or unsaturated hydrocarbons such as ethylene or propylene or fibers of polyamides, polyurethanes or polyesters. There may also be used fibers obtained on the basis of cellulose hydrate, cellulose esters or natural or synthetic albuminous compounds.

In special cases or if it is desired to obtain special effects, other substances may of course also be incorporated with the fiber mass. With aqueous suspensions of fibers, there may be used, for example, substances which favor the distribution of the fibers in water such as celluloseglycolic acid, alginic acid or dissolved polyvinyl alcohol. It is also possible to add a filler, for example barite, kaolin, talcum, aluminum salts or cork powder, pigment dyes or waxes. If necessary, substances like casein, glue or starch may be incorporated to bind the aforesaid additives. It is furthermore possible to enhance the bonding effect of the polyvinyl alcohol fibers by adding known binders or adhesive substances such as resins or water-soluble vinyl polymers. The articles may furthermore be subjected to a surface treatment by coating, impregnation or spraying, if desired with subsequent exposure to heat and/or mechanical pressure. For a surface treatment of this kind there may be used, for example, waxes, glue, rubber or the synthetic substances known for the coating of textiles or paper such as condensation products of urea or melamine and formaldehyde or partially saponified polyacrylonitrile. If desired, these substances may be produced on the articles themselves, for example with the application of polyfunctional isocyanates such as hexamethylene diisocyanate, toluylene diisocyanate or epoxides such as butadiene dioxide and compounds with reactive hydrogen atoms. It is also possible to combine the coating procedure with a process for uniting several layers of two dimensional structures by pressing.

The present invention is illustrated in the accompanying drawing wherein:

Fig. 3 is a view partially sectioned illustrating a continuous method for forming the non-woven structure;

Fig. 4 is a view illustrating an embodiment of the continuous method for forming the non-woven structure;

Figs. 5 and 6 are photographs of non-woven structures formed in accordance with Figs. 1–3; and Fig. 7 is a photograph of non-woven structures formed in accordance with Fig. 4.

Figure 1:
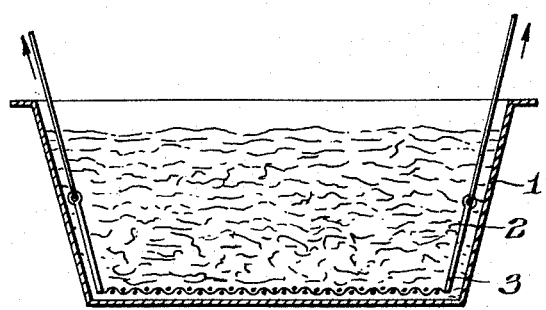
Figs. 1 and 2 are sections illustrating a discontinuous method for forming the non-woven structure.
Figure 2:
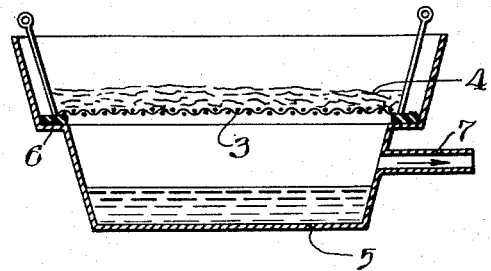

As seen in Figs. 1 and 2 of the drawing, there is provided a trough 1 in which is prepared at room temperature and in accordance with the process of the present invention an aqueous suspension of swellable polyvinylalcohol fibers 2 having a length of 3–4 mm. Screen tray 3 is placed at the bottom of the trough and can be lifted from the trough thereby causing the fibers to deposit on the screen. When the water has drained, a uniform fleece 4 of polyvinyl alcohol fibers forms on the screen as shown in Fig. 2. The screen tray is then placed on a second vessel 5 (see Fig. 2) and tightly sealed by means of a rubber gasket 6. This vessel 5 is then connected with a vacuum pump (not shown) through conduit 7 of vessel 5 and the remaining water is removed from the fleece by suction. The fiber fleece 4 is thereby also compressed. It is then treated with steam for a short period and dried at an elevated temperature and in this manner solidified.

Fig. 3 illustrates a continuous method used for the same working principle. The fiber pulp 2 consisting of polyvinylalcohol fibers and water is introduced into a funnel-shaped vessel 8 and flows through a slot-like aperture 9 on the endless screen belt 10 which slowly rotates around drums 11. The suction filter 12 removes the excess of water. The fiber fleece is squeezed by means of the roller 13 and dried by means of the two heated rotating drums 14. With the drying progressing, the material solidifies and is wound up on take-up roll 15. If desired, the fibrous material can be additionally treated with steam somewhere between drum 13 and the first drying drum 14.

Fig. 4 illustrates the preparation of non-woven two-dimensional structures according to the continuous working method with the use of a fleece passing through a carding machine. The dry and curled fibrous mass 16, the fibers of which have a cut-length of 40 mm., are made up by a carding machine 17 into a dry fiber fleece 18 which is taken up by a rotating screen belt 10 and moistened by spraying with water at room temperature in the spraying zone 19. The wet fleece 2 formed is squeezed by the squeeze roller 13 and then transported over the heated metal drums 14 on which it is dried and solidified. The solidified fleece is then wound upon roller 15.

The following examples serve to illustrate the invention but they are not intended to limit it thereto, the parts being by weight:

*Example 1*

Polyvinyl alcohol having a K-value of 74 and an acetyl content of 1.5% was dissolved to yield a 15% by weight solution in water. The solution was forced at 70° C. through a spinning nozzle provided with 1200 holes each 0.08 mm. in diameter into a saturated solution of sodium sulfate. The filaments formed in the coagulating bath were squeezed off and then stretched in a ratio of 1:2.5 while still wet. The filaments were subsequently dried at 110° C. by winding them around a heated cylinder and immediately thereafter conducted through a tube heated at 215° C. at such a speed that the time of stay in the tube amounted to 40 seconds. On their passage through the tube the filaments were after-stretched in a ratio of 1:3. They were subsequently wound on to a bobbin and passed through a similar tube at 224° C. in a manner such that they shrank by 8%. Finally, the filaments were cut into fibers 7 mm. long.

The fiber so obtained was suspended in a ratio of 1:300 in water which had been heated to room temperature and adjusted to a pH value of 4.2 with a small amount of diluted hydrochloric acid. The suspension was poured as uniformly as possible on to a sieve of 200 meshes per cm.² and the water in excess was suction-filtered. The sieve with the fiber cake was exposed for 5 minutes to the action of steam of 100° C. at such a distance from the discharge point of the steam that the fibers assumed a temperature of 80 to 85° C. After drying at 105° C. the fibers could be removed from the sieve. A well strengthened fiber fleece of high tearing strength and silky lustre was obtained. The product was capable of absorbing water.

*Example 2*

The fiber fleece obtained as described in Example 1 was treated for 4 minutes at 80° C. with a solution containing, per liter of water, 40 grams of formaldehyde, 200 g. of sulfuric acid and 250 grams of sodium sulfate. The fleece was then washed with cold water until free from acid and dried. By this treatment the resistance to water of the product was so improved that it could be boiled in water for more than 60 minutes without its structure or strength being affected. The fleece so treated was no longer capable of absorbing water and it was possible to write on it in ink. The product nevertheless had a soft and silky handle. The tearing strength of the wet product was considerably improved.

A sample of the paper-like article was dyed for 1½ hours at the boil with 3% (calculated upon the solid fiber substance) of a green dyestuff consisting of a mixture of 1,4-dihydroxyethylamino-5,8-dihydroxyanthraquinone and the dyestuffs of the following constitutions

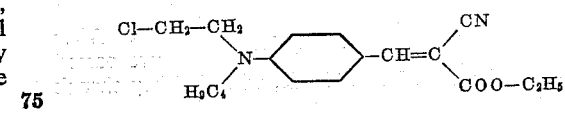

and

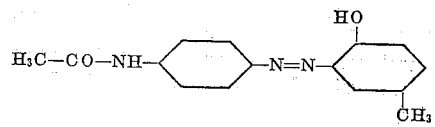

Deep dyeings resistant to water were obtained; the structure and the strength of the articles remained unchanged.

*Example 3*

The fiber fleece obtained as described in Example 1 was wetted with an aqueous solution containing 20% by weight of sulfuric acid and 22% by weight of sodium sulfate. The material was treated for 60 minutes at 75 to 80° C. with gaseous formaldehyde. After washing with water and drying, a product of a considerably improved resistance to water was obtained.

*Example 4*

A uniform mixture of 40 parts of a polyvinyl alcohol fiber 8 mm. long and obtained as described in Example 1 and 60 parts of a polyacrylonitrile fiber 5 mm. long was suspended in water in a ratio of 1:250. The suspension was uniformly poured on to a sieve and freed from the excess amount of water by filtering with suction. Such a quantity of fibers was suspended that, after suction-filtering, a fiber layer about 2 mm. high was obtained. The sieve with the fiber cake was introduced into a closed room saturated with moisture and the cake was heated for 8 minutes at 75 to 80° C. After drying, a felt-like article of good strength was obtained.

*Example 5*

50 parts of a polyvinyl alcohol fiber prepared as described in Example 1 were treated with formaldehyde as described in Example 2, mixed with 50 parts of untreated fibers 7 mm. long and suspended in water at 80° C. at a goods-to-liquor ratio of 1:300. After 3 minutes the suspension was uniformly poured on to a sieve, the water in excess was suction-filtered and the fibers were dried at 95 to 100° C. A well strengthened two dimensional structure was obtained which was treated with formaldehyde as described in Example 2 to improve its strength in the wet state.

*Example 6*

A 16% solution of polyvinyl alcohol having the properties described in Example 1 was spun into a saturated sodium sulfate solution and the filaments were stretched in the wet state in a ratio of 1:6. After being dried at 100° C., the filaments were heated to 150° C. by being passed over a heated metal cylinder. The filaments were then conducted through a tube which was in a horizontal position and heated at 225° C. at such a speed that the time of stay in the tube amounted to 75 seconds. On their passage through the tube, the filaments were neither stretched nor shrunk. The filaments were subsequently cut into fibers 5 mm. long and further treated as described in Example 1. A well strengthened two dimensional structure was obtained which was capable of absorbing water and could be acetalised.

*Example 7*

An aqueous solution containing per liter, 150 grams of polyvinyl alcohol having a K-value of 75 and an acetyl content of 1.8%, and 10 grams of polymeric vinylpyrrolidone was spun at 65° C. into a saturated aqueous sodium sulfate solution. The filaments were squeezed off and stretched, while wet, in a ratio of 1:2. They were then dried at 70 to 80° C. on a heated metal cylinder and immediately thereafter stretched in a ratio of 1:2.6 by passing them through a tube heated at 218° C. The time of stay in the tube was 40 seconds. After being wound on to a bobbin, the filaments were passed through a tube heated at 224° C., whereby they shrunk by 12%. The material was then washed with water at about 10° C., treated for a short time with a 1% aqueous solution of a quaternary nitrogen-containing stearic acid alkylamide and dried. The filaments were then mechanically crimped and cut into fibers 60 mm. long which were made into a fleece on a scribbling machine. The fleece was sprayed with water and aged for 3 minutes at 90° C. A well strengthened two dimensional structure was obtained which after being treated with formaldehyde showed a considerably increased resistance to water.

We claim:

1. A process for the manufacture of non-woven articles of fibers which comprises shaping a fiber mass comprising polyvinyl alcohol fibers capable of swelling in water at a temperature ranging from 40 to 90° C., without the fiber structure being changed, into a two dimensional structure, heating the shaped structure in a solvent consisting essentially of water to said temperature whereby the polyvinyl alcohol fibers swell without being dissolved, and subsequently drying the articles.

2. A process for the manufacture of non-woven articles of fibers which comprises shaping a fiber mass comprising polyvinyl alcohol fibers capable of swelling in water at a temperature ranging from 40° to 90° C., without the fiber structure being changed, into a two dimensional structure by forming an aqueous suspension of said fibers at a temperature below 40° C., distributing the fiber suspension in a shaping unit, drawing off the liquid from the suspension, treating the obtained structure with a solvent consisting essentially of water and having a temperature ranging from 40° to 90° C., and subsequently drying the structure whereby a non-woven article is obtained.

3. A process for the manufacture of non-woven articles of fibers which comprises shaping a fiber mass partially of polyvinyl alcohol fibers capable of swelling in water at a temperature ranging from 40° to 90° C., without the fiber structure being changed, into a two dimensional structure by forming an aqueous suspension of said fibers at a temperature below 40° C., distributing the fiber suspension in a shaping unit, drawing off the liquid from the suspension, treating the obtained structure with a solvent consisting essentially of water and having a temperature ranging from 40° to 90°, and subsequently drying the structure whereby a non-woven article is obtained.

4. A process for the manufacture of non-woven articles of fibers which comprises shaping a fiber mass comprising an extent of at least 10% of polyvinyl alcohol fibers capable of swelling in water at a temperature ranging from 40° to 90° C., without the fiber structure being changed, into a two dimensional structure by forming an aqueous suspension of said fibers at a temperature below 40° C., distributing the fiber suspension in a shaping unit, drawing off the liquid from the suspension, treating the obtained structure with a solvent consisting essentially of water and having a temperature ranging from 40° to 90° C., and subsequently drying the structure whereby a non-woven article is obtained.

5. A process for the manufacture of non-woven articles of fibers which comprises shaping a fiber mass comprising polyvinyl alcohol fibers capable of swelling in water at a temperature ranging from 40° to 90° C., without the fiber structure being changed, into a two dimensional structure by forming an aqueous suspension of said fibers at a temperature below 40° C., distributing the fiber suspension in a shaping unit, drawing off the liquid from the suspension, treating the obtained structure with a solvent consisting essentially of water and having a temperature ranging from 40° to 90° C., drying the structure whereby a non-woven article is obtained, and treating said article with an acetalizing substance at a temperature within the range of 50 to 95° in the presence of an acid.

6. A process for the manufacture of non-woven articles, of fibers which comprises shaping a fiber mass comprising polyvinyl alcohol fibers capable of swelling in water at a temperature ranging from 40° to 90° C., without the fiber structure being changed, into a two dimensional structure by forming an aqueous suspension of said fibers at a temperature below 40° C., distributing the fiber suspension in a shaping unit, drawing off the liquid from the suspension, treating the obtained structure with a solvent consisting essentially of water and having a temperature ranging from 40° to 90° C., drying the structure whereby a non-woven article is obtained, and treating said article at a temperature within the range of 50° to 95° C. with an acetalizing substance selected from the group consisting of formaldehyde, butyraldehyde, glyoxal and terephthalaldehyde.

7. A process for the manufacture of non-woven articles of fibers which comprises shaping a fiber mass comprising fibers of saponified copolymers of vinylacetate and another monomer selected from the group consisting of acrylic acid, acrylic acid amide, methacrylic acid amide and vinylpyrrolidone which fibers are capable of swelling in water at a temperature ranging from 40° to 90° C., without the fiber structure being changed, into a two dimensional structure by forming an aqueous suspension of said fibers at a temperature below 40° C., distributing the fiber suspension in a shaping unit, drawing off the liquid from the suspension, treating the obtained structure with a solvent consisting essentially of water and having a temperature ranging from 40° to 90° C. and subsequently drying the structure whereby a non-woven article is obtained.

8. A process for the manufacture of non-woven articles of fibers which comprises shaping a fiber mass comprising fibers of mixtures of polyvinyl alcohol and other polymers selected from the group consisting of polyacrylic acid amide, polyacrylic acid, polyvinylpyrrolidone in an amount up to 20% of the amount of polyvinyl alcohol which fibers are capable of swelling in water at a temperature ranging from 40° to 90° C., without the fiber structure being changed, into a two dimensional structure by forming an aqueous suspension of said fibers at a temperature below 40° C., distributing the fiber suspension in a shaping unit, drawing off the liquid from the suspension, treating the obtained structure with a solvent consisting essentially of water and having a temperature ranging from 40° to 90° C., and subsequently drying the structure whereby a non-woven article is obtained.

9. A process for the manufacture of non-woven articles of fibers which comprises shaping a fiber mass comprising polyvinyl alcohol fibers capable of swelling in water at a temperature ranging from 40 to 90° C. without the fiber structure being changed into a two dimensional structure by forming a fleece of said fibers, distributing the fleece onto a shaping unit, impregnating said fleece with a solvent consisting essentially of water at a temperature below 40° C., and subsequently drying said fleece at such a temperature that the wet fleece is heated to a temperature between 40°–90° C. whereby a non-woven article is obtained.

10. A process for the manufacture of non-woven articles of fibers which comprises shaping a fiber mass partially comprising polyvinyl alcohol fibers capable of swelling in water at a temperature ranging from 40 to 90° C. without the fiber structure being changed into a two dimensional structure by forming a fleece of said fibers, distributing the fleece onto a shaping unit, impregnating said fleece with a solvent consisting essentially of water at a temperature below 40° C., and subsequently drying said fleece at such a temperature that the wet fleece is heated to a temperature between 40–90° C. whereby a non-woven article is obtained.

References Cited in the file of this patent

UNITED STATES PATENTS

| | | |
|---|---|---|
| 2,011,914 | Schwartz | Aug. 20, 1935 |
| 2,068,456 | Hooper | June 19, 1937 |
| 2,265,283 | Herrmann et al. | Dec. 9, 1941 |
| 2,294,966 | Dreyfus | Sept. 8, 1942 |
| 2,328,992 | Nielsen | Sept. 7, 1943 |
| 2,343,330 | Sawyer | Mar. 7, 1944 |
| 2,361,369 | Grebe et al. | Oct. 31, 1944 |
| 2,522,526 | Manning | Sept. 19, 1950 |
| 2,639,970 | Tomonari | May 26, 1953 |